(12) United States Patent
McGurran et al.

(10) Patent No.: US 7,952,805 B2
(45) Date of Patent: May 31, 2011

(54) SOLAR CONTROL FILM

(75) Inventors: Daniel J. McGurran, Woodbury, MN (US); Edward J. Kivel, Stillwater, MN (US); Jeffrey A. Boettcher, Woodbury, MN (US); Laurence R. Gilbert, Marine on St. Croix, MN (US); Mitsuhiro M. Kominami, Kanagawa (JP); Raghunath Padiyath, Woodbury, MN (US); Stephen J. Strauss, Hastings, MN (US)

(73) Assignee: 3m Innovative Properties Company, St. Paul, MN (US)

( * ) Notice: Subject to any disclaimer, the term of this patent is extended or adjusted under 35 U.S.C. 154(b) by 333 days.

(21) Appl. No.: 11/466,232

(22) Filed: Aug. 22, 2006

(65) Prior Publication Data

US 2008/0075936 A1 Mar. 27, 2008

(51) Int. Cl.
G02B 5/28 (2006.01)
(52) U.S. Cl. ......... 359/589; 359/350; 359/359; 359/360
(58) Field of Classification Search .......... 359/350–361, 359/589
See application file for complete search history.

(56) References Cited

U.S. PATENT DOCUMENTS

| | | |
|---|---|---|
| 3,610,724 A | 10/1971 | Frizzell |
| 3,711,176 A | 1/1973 | Alfrey |
| 4,446,305 A | 5/1984 | Rogers |
| 4,540,623 A | 9/1985 | Im |
| 5,448,404 A | 9/1995 | Schrenk |
| 5,882,774 A | 3/1999 | Jonza |
| 6,045,894 A | 4/2000 | Jonza |
| 6,531,230 B1 | 3/2003 | Weber |
| 6,579,608 B1 | 6/2003 | Kondo |
| 6,635,342 B1 | 10/2003 | Ben-Zvi et al. |
| 6,811,867 B1 | 11/2004 | McGurran |
| 2001/0022982 A1 | 9/2001 | Neavin |
| 2002/0086926 A1* | 7/2002 | Fisher .......................... 524/403 |
| 2003/0054160 A1 | 3/2003 | Fisher et al. |
| 2006/0154049 A1* | 7/2006 | Padiyath et al. .............. 428/328 |
| 2006/0197953 A1* | 9/2006 | Perez et al. .................... 356/445 |
| 2006/0231797 A1* | 10/2006 | Riman et al. .......... 252/301.4 H |
| 2006/0251874 A1* | 11/2006 | McClure et al. .............. 428/210 |
| 2006/0269739 A1 | 11/2006 | Phillips |
| 2007/0248803 A1 | 10/2007 | Kliesch |
| 2010/0098953 A1 | 4/2010 | Hayes |

FOREIGN PATENT DOCUMENTS

| | | |
|---|---|---|
| JP | 2006-104365 | 4/2006 |
| WO | WO 99/36262 | 1/1999 |
| WO | WO 99/36248 | 7/1999 |
| WO | WO 99/39224 | 8/1999 |
| WO | WO 2005-052049 A1 | 6/2005 |

* cited by examiner

Primary Examiner — Joshua L Pritchett
(74) Attorney, Agent, or Firm — Jeffrey M. Olofson

(57) ABSTRACT

A transparent solar control film may have a single or multiple layer core that includes at least one layer of an orientated thermoplastic polymer material. Infrared radiation absorbing nanoparticles that preferentially absorb at least about 100 times more infrared radiation than visible radiation may be dispersed within the at least one layer of an oriented thermoplastic polymer layer. The transparent solar control film may have a haze value of less than about 5 percent.

20 Claims, 1 Drawing Sheet

SOLAR CONTROL FILM

BACKGROUND

The present disclosure relates generally to solar control films and method of forming the same and more particularly to solar control film that includes infrared absorbing nanoparticles.

Dyed and vacuum-coated plastic films have been applied to windows to reduce heat load due to sunlight. To reduce heat load, solar transmission is blocked in either the visible or the infrared portions of the solar spectrum (i.e., at wavelengths ranging from 400 nm to 2500 nm or greater.)

Primarily through absorption, dyed films can control the transmission of visible light and consequently provide glare reduction. However, dyed films generally do not block near-infrared solar energy and consequently are not completely effective as solar control films. Dyed films also often fade with solar exposure. In addition, when films are colored with multiple dyes, the dyes often fade at different rates, causing an unwanted color changes over the life of the film.

Other known window films are fabricated using vacuum-deposited grey metals, such as stainless steel, inconel, monel, chrome, or nichrome alloys. The deposited grey metal films offer about the same degrees of transmission in the visible and infrared portions of the solar spectrum. As a result, the grey metal films are an improvement over dyed films with regard to solar control. The grey metal films are relatively stable when exposed to light, oxygen, and/or moisture, and in those cases in which the transmission of the coatings increases due to oxidation, color changes are generally not detectable. After application to clear glass, grey metals block light transmission by approximately equal amounts of solar reflection and absorption.

Vacuum-deposited layers such as silver, aluminum, and copper control solar radiation primarily by reflection and are useful only in a limited number of applications due to the high level of visible reflectance. A modest degree of selectivity (i.e., higher visible transmission than infrared transmission) is afforded by certain reflective materials, such as copper and silver.

SUMMARY

In one exemplary implementation, the present disclosure is directed to a transparent solar control film that has a single or multiple layer core including at least one layer of an orientated thermoplastic polymer material. Infrared radiation absorbing nanoparticles that preferentially absorb at least about 100 times more infrared radiation than visible radiation are dispersed within the at least one layer of an oriented thermoplastic polymer layer. The transparent solar control film has a haze value of less than about 5 percent.

In another exemplary implementation, the present disclosure is directed to a method of forming a transparent solar control film. Infrared absorbing nanoparticles are dispersed into a polymer or a polymer precursor to form a nanoparticle dispersion. A polymeric infrared absorbing nanoparticle film is formed from the nanoparticle dispersion. The polymeric infrared absorbing nanoparticle film is oriented to form an orientated solar control film that has a haze value of less than 5 percent. The infrared radiation absorbing nanoparticles preferentially absorb at least about 100 times more infrared radiation than visible radiation.

These and other aspects of the solar control films according to the subject invention will become readily apparent to those of ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, in which.

DETAILED DESCRIPTION

Figure 1:
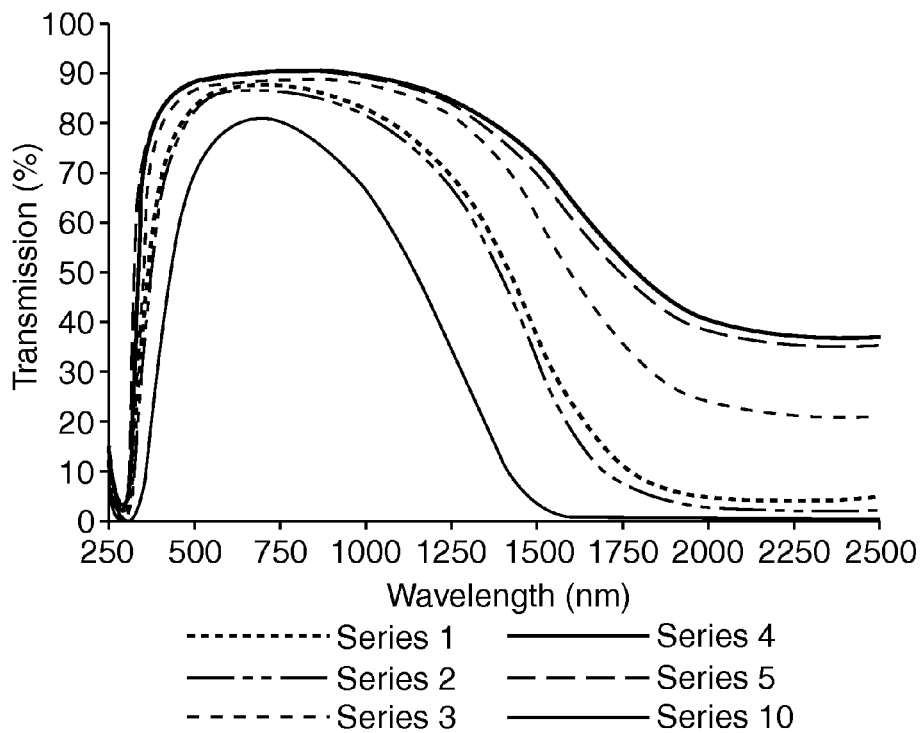
FIG. 1 a graph of samples 6-9 transmission % as a function of wavelength.

The present disclosure pertains generally to a transparent solar control film that includes at least one layer of an oriented thermoplastic polymer material within a single or multiple layer core. Infrared radiation absorbing nanoparticles that preferentially absorb at least about 100 (one hundred) times more infrared radiation than visible radiation (i.e., light) are dispersed within the at least one layer of an orientated thermoplastic polymer material.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a film" encompasses embodiments having one, two or more films. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof.

The solar control films described herein are at least substantially transparent to visible light (i.e., radiation) (400 to 780 nanometers) while being at least partially opaque to infrared radiation) (780 to 2500 nanometers). The transparent solar control films described herein can have an average visible light transmission (400 to 780 nm) of at least 20% or, at least 45%, or at least 70%, and an average infrared light transmission for 780 nm to 2500 nm light of less than 10%, or less than 15%, or less than 20%. In some instances, the solar control film has an average visible light transmission of at least 60% and an infrared light transmission of 25% or less for substantially all wavelengths between 950 nm and 2500 nm. In some embodiments, the solar control film has an average visible light transmission of at least 70% or at least 72%.

The performance of the solar control films described herein may be measured via haze, which is defined as the percentage of light which, in passing through the film, deviates from the incident beam through forward scatter by more than a specified average degree. ASTM D1003 provides one method for making such a measurement.

When the haze of an optical body is determined against light scattering about the surface of body exposed to air, the measured haze includes the haze caused by both surface and internal optical effects. This is considered the "total" haze for the optical body. The optical effects generated by the body itself internally, or "internal" haze, can be determined by measuring the haze of the optical body when it is immersed in a fluid of substantially similar refractive index. Generally, the solar control films described within this disclosure will exhibit an internal haze of less than about five percent and in some instances less than about three percent.

The single or multiple layer core of the transparent solar control film includes or is formed from any thermoplastic polymer material, including polyesters having terephthalate or naphthalate comonomer units. Examples of suitable materials include, for example, polyethylene naphthalate (PEN), polyethylene terephthalate (PET) and copolymers and blends thereof.

Examples of other suitable polyester copolymers are provided in, for example, published patent application WO 99/36262 and in WO 99/36248, both of which are incorporated herein by reference. Other suitable polyester materials include polycarbonates, polyarylates, and other naphthalate and terephthalate-containing polymers, such as, for example, polybutylene naphthalate (PBN), polypropylene naphthalate (PPN), polybutylene terephthalate (PBT) and polypropylene terephthalate (PPT), and blends and copolymers of any of the above with each other or with non-polyester polymers.

Particular examples of suitable polyester copolymers include polyethylene naphthalate or a copolymer thereof, polyethylene terephthalate or a copolymer thereof, polycarbonates, polyarylates, polybutylene naphthalate, polypropylene naphthalate, polybutylene terephthalate, polypropylene terephthalate, or blends and copolymers of any of the above with each other or with other polymers.

In some instances, the single or multiple layer core may be or may include a multi-layer optical film. The layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of the multilayer film are a function of the refractive indices of the respective layers (i.e., microlayers). Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. In practice, the refractive indices are controlled by judicious materials selection and processing conditions. The multilayer film can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared. In order to achieve high reflectivities with a reasonable number of layers, adjacent layers preferably exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z \leq 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and US Patent Publication 2001/0022982 A1 (Neavin et al.), "Apparatus For Making Multilayer Optical Films", all of which are incorporated herein by reference. In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers. In many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In another embodiment, the multilayer optical film is formed by alternating layers of a first polymer type including polyethylene terephthalate and a second polymer type including a copolymer of poly(methyl methacrylate and ethyl acrylate).

In another embodiment, the multilayer optical film is formed by alternating layers of a first polymer type including cyclohexanedimethanol (PETG) or a copolymer of cyclohexanedimethanol (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly(methyl methacrylate). Useful combination of alternating polymer type layers are disclosed in U.S. Pat. No. 6,352,761, which is incorporated by reference herein.

The single or multiple layer core of the transparent solar control film includes at least one layer of an orientated thermoplastic polymer material. In some cases, such a layer may be oriented after a quenching process in either or both the lengthwise (sometimes referred to as machine) direction and the transverse (or cross-machine) direction. Although the degree of orientation in either direction can vary greatly (and are not necessarily the same), typically stretching dimensions vary between 2.5 and 5.0 times the cast dimensions. In some cases, a thermoplastic material may be heated before or during orientation, e.g., by infrared lamps or forced convection, to raise its temperature to slightly above its glass transition temperature.

When multi-layer optical films are employed, for example, it may be necessary to achieve given relationships among the various indices of refraction (and thus the optical properties) of the multilayer device. In the case of organic polymer films, these properties can be obtained and/or controlled by stretching or orientation. Generally, this is accomplished by preparing the polymer films by co-extruding the individual polymers to form a multilayer film and then orienting the film by stretching at a selected temperature, optionally followed by heat-setting at a selected temperature. Alternatively, the extrusion and orientation steps may be performed simultaneously.

When stretched, the oriented layer may also be allowed to dimensionally relax in the cross-stretch direction from the natural reduction in cross-stretch (equal to the square root of the stretch ratio) or may also be constrained (i.e., no substantial change in cross-stretch dimensions). The oriented layer may be stretched in the machine direction, as with a length orienter, and in the width direction using a tenter, or at diagonal angles.

It will be understood with respect to such stretching and orientation processes, that the pre-stretch temperature, stretch temperature, stretch rate, stretch ratio, heat set temperature, heat set time, heat set relaxation, and cross-stretch relaxation are selected to yield a film having desired properties, including a desired refractive index relationship. These variables are inter-dependent; thus, for example, a relatively low stretch rate could be used or coupled with, e.g., a relatively low stretch temperature. It will be apparent to one of ordinary skill how to select the appropriate combination of these variables to achieve a desired multilayer device. In general, suitable stretch ratios are 1:2-10 or 1:3-7 along one axis and 1:0.5-1 or 1:1-7 along a second axis.

In accordance with the disclosure, the single or multiple layer polymeric core includes at least one oriented layer of a thermoplastic polymer material wherein dispersed within the polymeric material is an infrared radiation absorbing nanoparticle that preferentially absorbs at least about 100 (one hundred) times more infrared radiation than visible radiation.

In some instances, the infrared radiation absorbing nanoparticles may preferentially absorb at least about 1000 (one thousand) times more infrared radiation than visible radiation, and in some instances may preferentially absorb at least about 10,000 (ten thousand) times more infrared radiation than visible radiation.

The infrared radiation absorbing nanoparticles may include any material that preferentially absorbs infrared radiation. Examples of suitable materials include metal oxides such as tin, antimony, indium and zinc oxides and doped oxides.

In some instances, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include antimony oxide (ATO) and/or indium tin oxide (ITO). In some cases, the infrared radiation absorbing nanoparticles may include or be made of lanthanum hexaboride, or $LaB_6$.

Lanthanum hexaboride is an effective near IR (NIR) absorber, with an absorption band centered on 900 nm. The infrared radiation absorbing nanoparticles can be sized such that they do not materially impact visible light transmission. In some instances, the infrared radiation absorbing nanoparticles may have any useful size such as, for example, 1 to 100, or 30 to 100, or 30 to 75 nanometers.

The infrared radiation absorbing nanoparticles may be incorporated into the thermoplastic polymer material by mixing or milling the infrared radiation absorbing nanoparticles into the polymer using conventional mixing and/or milling equipment. In some instances, the infrared radiation absorbing nanoparticles may be dispersed into the polymer during polymerization. In some cases, the infrared radiation absorbing nanoparticles may first be dispersed within polymer monomers before polymerization.

In some cases, if desired, the single or multiple layer core may include an optional layer or skin that does not include any of the infrared radiation absorbing nanoparticles. This surface layer can act to reduce the surface roughness of the overall construction and help maintain clarity and low haze. The skin layer or layers can be coextruded onto one or both outer surfaces of the single or multiple layer core.

Alternatively, the skin layer or layers can be coated or laminated onto the single or multiple layer core using a suitable pressure sensitive or non-pressure sensitive adhesive. Suitable coatings include, but are not limited to, hardcoats, adhesives, antistatics, adhesion promoting primers, UV stabilizing coatings, etc. One or more additional layers (films, laminates, and/or coatings) can also be incorporated along with the skin layers. The skin layers are preferably made of a transparent polymer, for example, a polyester (the same or different as that used in the construction of the single or multiple layer core), polyolefin, polycarbonate, or other thermoplastic polymer.

In some cases, a transparent solar control film may include a metallic layer that is located on the single or multiple layer core. If a metallic layer is included, it may have a visible radiation transmission in the range from about 1 to about 90 percent. A metallic layer may be a single metal or a combination of metals. If more than one metal is used, the metallic layer may be a single layer alloy or a multi-layered metallic layer. Specific metals and alloys are chosen based on the desired color, transmission, reflectivity, and absorption properties of the optical body. Some examples of suitable metals include aluminum, silver, gold, copper, nickel, titanium, iron, stainless steel, platinum, tin, lead, chromium, inconel, and combinations thereof. Other transition metals, oxides, and alloys thereof will also be suitable for certain applications.

If a metallic layer is included, it can have a uniform or substantially uniform thickness. The thickness of the metallic layer may depend, for example, on the type of metal or alloy used. For example, if the metallic layer is aluminum, it can have a thickness between about 0.5 to about 29 nanometers. If nickel is used, it should have a thickness between about 0.5 and about 52 nanometers. For silver, the thickness can be between about 2 and about 69 nanometers. These thicknesses will yield a visible light transmission that is in the range between about 1 percent and about 90 percent.

A metallic layer, if included, can be provided in a variety of different techniques. Examples of suitable processes include vapor deposition, cathode sputtering, pyrolysis, powder coating, ion plating, e-beam deposition, and the like. Vapor deposition and cathode sputtering are often preferred in view of the uniformity of structure and thickness that can be obtained. Cathode sputtering is also particularly useful with deposition of metal alloys in order to maintain uniformity in the composition of the metallic layer. As an alternative to surface metalization techniques, the metal layer may also be constructed as a separate sheet and then laminated onto one or more outer surfaces of the single or multiple layer core.

In some cases, a color pigment or pigments may be dispersed within the single or multiple layer core, or within a skin or cover layer disposed on the single or multiple layer core. Examples of suitable pigments include carbon black, inorganic compounds such as oxides, salts and other compounds of iron, titanium, antimony, zirconium, zinc, barium, calcium, cadmium, lead, chromium, molybdenum, manganese, silicon, aluminum, sodium, cobalt, copper, and other metals.

Particular examples include iron oxides, ammonium ferrocyanides (iron blues), titanium dioxides, antimony oxides, zirconium oxides, zirconium silicates, zinc oxides, zinc sulfides, barium sulfates, calcium carbonates, calcium sulfates, cadmium sulfides, cadmium selenides, lead sulfates, chromium oxides, chromates, molybdates, manganates, silica, silicates, aluminosilicates, sodium alumino sulphosilicates (ultramarines) such as Ultramarine Blue, Ultramarine Violet, and Ultramarine Pink, and other metal oxides, as well as other simple and complex inorganic compounds; inorganic complexes, such as Pigment Blue 28, Cobalt Blue, Cobalt Aluminate, King's Blue, Thenard's Blue, Cadmium Red, Molybdate Orange, Lead Molybdate, Chrome Yellow, Lead Chromates, Chrome Green, Pigment Yellow 53, Titanium Yellow, Nickel Titanate, Nickel Antimony Titanate, Nickel Titanate Yellow, Pigment Violet 16, Manganese Violet, Permanent Violet, Nuremberg Violet, Mineral Violet, and Fast Violet; and organic pigments such as phthalocyanines, copper phthalocyanines, quinacridones, anthraquinones, perylenes, perinones, dioxazines, diketo-pyrrolo-pyrrols (DPPs), indanthrones, benzidines, isoindolines and isoindolinones, benzimidazolones, and azo, disazo, or polyazo pigments (such as Naphthol Red, diarylides, dianisidine, and pyrazolone) including metallized azo pigments (such as Lake Red C, Permanent Red 2B, Nickel Azo Yellow, Lithol Red, and Pigment Scarlet).

Pigments such as $V_2O_5$ and $P_2O_5$ can also be useful in absorbing light in the infrared and ultra-violet, as well as visible regions, which may be desirable in certain applications. These various pigments can be used alone or in combination to achieve different tinting tones, absorption profiles, and/or physical properties. The particulate pigment (or pigment blend) should be incorporated within the thermoplastic polymer in proportion to the level of pigmentation, or "tinting," desired for the overall construction.

Generally, the particulate pigment will be added to the thermoplastic polymer in an amount between about 0.01 and 1.0 percent by weight, more preferably, between about 0.02 and 0.5 percent by weight, though more or less pigment can be employed depending on the application and particular pigment chosen.

In certain cases, two or more particulate pigments can be used in combination with one another to achieve a desired coloration or to optimally control a neutral color. For example, one or more colored pigments or dyes can be combined to make a construction of a given color (e.g., blue) or, where an optimally neutral coloration is desired, a small amount of one or more colored pigments may be added to correct for slight off-color absorption sometimes associated with the use of single pigments. The latter effect, that of optimizing neutral color, can find particular application for use of carbon black, which, when present at relatively high loadings, can display a yellow tint.

If included, commercial-sized agglomerates or beads of pigment are reduced to a median diameter of between about 10 and 500 nm, or perhaps a diameter of between about 20 and 100 nm. This may be accomplished, for example, by milling the agglomerates in a minimum amount of solvent, for example ethylene glycol, preferably also in the presence of a dispersing agent such as polyvinylpyrrolidone (PVP). Generally, the dispersant (e.g. PVP) is added in an amount from about 1 to 40 parts by weight per 100 parts of carbon black. It will be understood that the optimal ratio of dispersing agent to pigment will vary with the type of pigment used.

The particulate pigment dispersion may be incorporated into thermoplastic polymer material, for example, by milling the pigment into the polymer using conventional mixing and/or milling equipment. A uniform dispersion of the particulate pigment in the thermoplastic material is, however, more readily achieved by dispersing the pigment into the polymer during polymerization. This allows for dispersion of the pigment throughout a relatively low viscosity monomer mixture, avoiding the more difficult milling processes. To accomplish this, the particulate pigment can be dispersed into the polymer reactant medium in a suitable solvent, for example, ethylene glycol, with the aid of PVP or other dispersant. This dispersion may also be added to the reaction mass of a condensation polymer-forming process. Useful uniform dispersion of carbon black particles, for example, can be obtained by adding the milled carbon black, ethylene glycol, and dispersant to the polyester reaction mass immediately following the ester interchange step.

A generally preferred method for incorporating the particulate pigment into the pre-polymerized reaction mass is to first create a slurry of the particulate pigment in ethylene glycol. A useful slurry can be created with 10 percent pigment by weight in the ethylene glycol. As noted above, the slurry can also incorporate one or more wetting or dispersing agents, such as PVP. The slurry can be pre-mixed and, after pre-mixing, be passed several times through a media mill. The milled mixture can also be passed through a fine filter (e.g., on the order of 1 micron) to provide additional particle size control. The final mixture can be charged directly to a reaction vessel along with the pre-polymerized condensation polymer forming reaction mass. The resulting polymer typically will be loaded with about 1 to about 5 percent by weight of the pigment. The high shear mixing both within the mill during mixing and during the polymerization reaction within the reaction vessel can help contribute to the uniformity of the pigment dispersion within the polymer and can help reduce undesired agglomeration of the particles in the polymer resin.

It will be recognized that certain optical properties may be defined using the L*, a* and b* color scales. The L*, a*, and b* values are based upon the CIE (International Commission on Illumination) method, which determines the color scales using the transmission or reflection of the test material as a function of the wavelength of incident light, the spectral power of a chosen standard illuminant, and the color-matching functions of a CIE standard observer. The CIE procedures for determining L*, a*, and b* values are described in detail in ASTM E308 and ASTM E1164. ASTM E308 discusses the standard practice for computing the colors of objects using the CIE system, and ASTM E1164 discusses the standard practice for obtaining spectrophotmetric data for object-color evaluation. The L*, a*, and b* values cited herein are those determined using transmission within the visible spectrum, the CIE standard Illuminant C (representing daylight), and the color-matching functions of a 2 degree CIE standard observer.

The L*a*b* color scales for a given object serve as coordinates to describe a certain color region in a three-dimensional color space. The a* and b* values describe the hue and saturation of the color. For example, a positive a* value is in the red region, while a negative a* value is located in the green region. A positive b* value is in the yellow region, and a negative b* is in the blue region. While the sign (positive or negative) of the a* and b* values determines the hue of an optical body, the absolute value determines the saturation of that particular hue.

An increasing absolute value corresponds to a higher saturation. The L* coordinate relates to the intensity or brightness of the optical body. Larger positive L* values corresponds to the white region, while smaller positive L* values approaching zero correspond to the black region. When the a* and b* color scales of the optical body approach zero, this corresponds to a neutral or gray color region. Therefore, to obtain a gray appearance, the a* and b* color scales should have an absolute value of about 5 or less. More preferably, the a* and b* color scales should have an absolute value of about 3 or less.

Although the L*, a*, and b* color scales can be measured accurately to several decimal places, an appreciable difference between color scales is generally one which can be perceived by the human eye. The human eye perceives differences in the color scales by noticing a change in the color or "shade" of the object. Typically, the human eye can only perceive differences between color scales when the absolute value of the difference is about 1 or more. Therefore, if a first material is considered to have a color scale that differs from the corresponding color scale of a second material, the absolute value of the difference between the two corresponding color scales should be about 1 or more, and more preferably, about 2 or more.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. Methods of forming the polyethylene terephthalate (PET) thermoplastic polymer, resin masterbatchs and methods of forming the film samples are disclosed in U.S. Pat. No. 6,811,867, which is incorporated by reference herein.

Test Methods

Luminous Transmittance (Visible Light Transmittance) and Haze

The luminous transmittance (Te) and haze of all samples were measured according to American Society for Testing and Measurement (ASTM) Test Method D 1003-95 ("Standard Test for Haze and Luminous Transmittance of Transparent Plastic") using a TCS Plus Spectrophotometer from BYK-Gardner Inc., Silver Springs, Md. Transmittance and Reflectance spectra of the sample were measured using a Perkin-Elmer Lambda 9 spectrophotometer.

Preparation of Resin Masterbatchs

A commercially available indium tin oxide (ITO) sol (ITO-3 Mb) from Tohoku Chemical was combined with polyethylene terephthalate (PET) thermoplastic polymer to produce a resin masterbatch.

The ITO sol includes 20% ITO nanoparticles, 5% dispersant, and 75% diacetone alcohol. This sol was added to a 7.57 liter (2 gal) esterification/polymerization reactor equipped with a packed distillation column. The batch was heated in order to distill off some of the solvent.

Ethylene glycol was added with di-methyl terephthalate (DMT) and catalyst to form the polyethylene terephthalate (PET) thermoplastic polymer.

The ITO sol was with the PET polymer at two levels to form two resin masterbatches as described in the table below. These resin masterbatches where made into 405 micrometer (16 mil) cast webs and then stretched (orientated) at a variety of ratios to produce samples of varying thickness as described in the table below. Optical properties were measured according to the methods described above. Results of these optical measurements are reported for each sample below.

|        | Sample |      |      |      |      |      |      |       |      |      |
|--------|--------|------|------|------|------|------|------|-------|------|------|
|        | 1      | 2    | 3    | 4    | 5    | 6    | 7    | 8     | 9    | 10   |
| Y      | 85.2   | 84.5 | 87.7 | 87.9 | 87.8 | 87.8 | 89.6 | 89.3  | 86.3 | 74.4 |
| CIE a* | −0.8   | −0.8 | −0.3 | −0.2 | −0.2 | −0.5 | −0.1 | −0.03 | −0.8 | −1.9 |
| CIE b* | 5.23   | 5.78 | 2.4  | 1.7  | 1.7  | 2.9  | 0.9  | 0.61  | 4.61 | 15.9 |

-continued

|  | Sample | | | | | | | | | |
|---|---|---|---|---|---|---|---|---|---|---|
|  | 1 | 2 | 3 | 4 | 5 | 6 | 7 | 8 | 9 | 10 |
| Te | 74.1 | 72.9 | 80.8 | 83.3 | 83.0 | 80.3 | 87.3 | 88.2 | 75.7 | 58.7 |
| PET (kg) | 4.54 | 4.54 | 4.54 | 4.54 | 4.54 | 4.54 | 4.54 | 4.54 | 4.54 | 4.54 |
| ITO-3Mb (kg) | 2 | 2 | 2 | 2 | 2 | 0.38 | 0.38 | 0.38 | 0.38 | 2 |
| ITO % wt | 1.18 | 1.18 | 1.18 | 1.18 | 1.18 | 0.38 | 0.38 | 0.38 | 0.38 | 1.18 |
| Caliper (μm) | 105 | 103 | 41 | 27 | 26 | 196 | 51 | 25 | 388 | 420 |
| Haze (%) | 1.59 | 2.45 | 1.11 | 1.21 | 0.94 | 1.93 | 0.91 | 0.99 | 2.9 | 0.57 |

Figure 2:
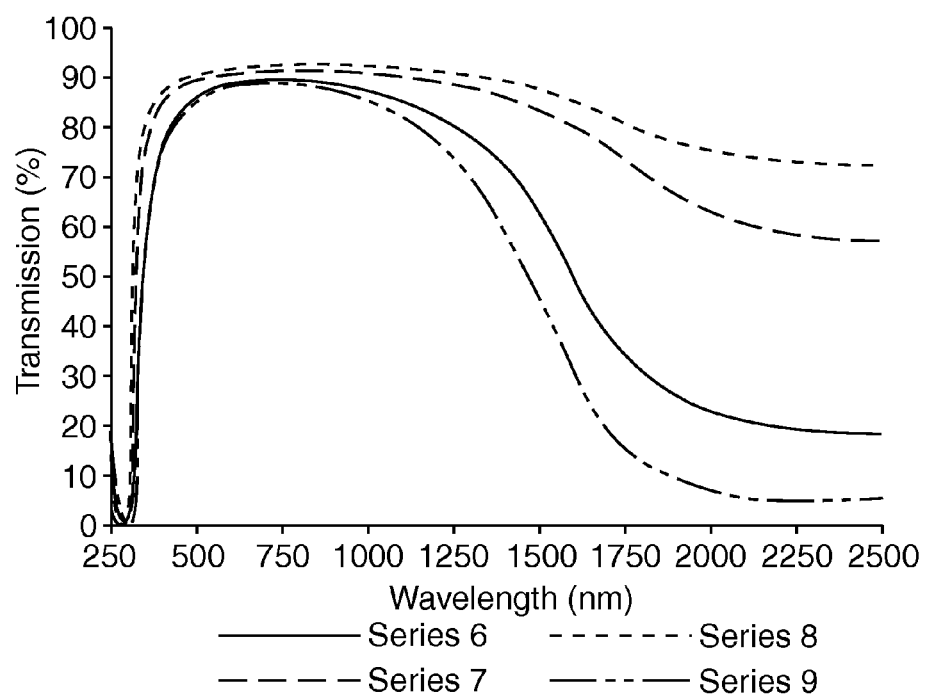
FIG. 2 is a graph of samples 1-5 and 10 transmission % as a function of wavelength.

FIG. 1 is a graph of samples 6-9 transmission % as a function of wavelength. FIG. 2 is a graph of samples 1-6 and 10 transmission % as a function of wavelength.

We claim:

1. A transparent solar control film comprising:
   a single or multiple layer core comprising at least one layer of an oriented thermoplastic polymer material; and
   at least 0.38 weight % infrared radiation absorbing nanoparticles dispersed within the at least one layer of an oriented thermoplastic polymer layer;
   wherein the infrared radiation absorbing nanoparticles preferentially absorb at least 100 times more infrared radiation than visible radiation and the transparent solar control film has a haze value of less than 5%.

2. A transparent solar control film according to claim 1 wherein the infrared radiation absorbing nanoparticles preferentially absorb at least 1000 times more infrared radiation than visible radiation.

3. A transparent solar control film according to claim 1 wherein the infrared radiation absorbing nanoparticles preferentially absorb at least 10000 times more infrared radiation than visible radiation.

4. A transparent solar control film according to claim 1 wherein the thermoplastic polymer material comprises a polyethylene naphthalate, polyethylene terephthalate, polycarbonates, polyarylates, polybutylene naphthalate, polypropylene naphthalate, polybutylene terephthalate, polypropylene terephthalate, or blends and copolymers of any of the above with each other or with other polymers.

5. A transparent solar control film according to claim 1 wherein the thermoplastic polymer material comprises a polyethylene naphthalate, polyethylene terephthalate, a copolymer of polyethylene naphthalate, or a copolymer of polyethylene terephthalate.

6. A transparent solar control film according to claim 1 wherein the solar control film has a haze value of less than 3%.

7. A transparent solar control film according to claim 1 wherein the infrared absorbing nanoparticles comprise lanthanum hexaboride.

8. A transparent solar control film according to claim 1 wherein the infrared absorbing nanoparticles comprise tin oxide, indium tin oxide, or antimony tin oxide.

9. A transparent solar control film according to claim 1 wherein the single or multiple layer core comprises a plurality of alternating polymeric layers of a first polymer material and a second polymer material and at least one of the alternating layers is birefringent and oriented and the alternating polymeric layers cooperate to reflect infrared radiation.

10. A transparent solar control film according to claim 1 further comprising a metallic layer located on the single or multiple layer core, the metallic layer having a visible light transmission in a range from 1 to 90%.

11. A transparent solar control film according to claim 1 further comprising a color pigment dispersed within the single or multiple layer core.

12. A transparent solar control film according to claim 1 wherein the solar control film has a visible light transmission of greater than 70%.

13. A method of forming a transparent solar control film:
   dispersing at least 0.38 weight % infrared absorbing nanoparticles into a polymer or polymer precursor to form a nanoparticle dispersion;
   forming a polymeric infrared absorbing nanoparticles film from the nanoparticle dispersion; and
   orienting the polymeric infrared absorbing nanoparticle film to form an oriented solar control film having a haze value of less than 5% and the infrared radiation absorbing nanoparticles preferentially absorb at least 100 times more infrared radiation than visible radiation.

14. A method according to claim 13 wherein the forming step comprises extruding the nanoparticle dispersion onto a polymeric infrared absorbing nanoparticles film.

15. A method according to claim 13 wherein the orienting step comprises stretching the polymeric infrared absorbing nanoparticle film to form an oriented solar control film.

16. A method according to claim 13 wherein the solar control film has a haze value of less than 3.

17. A method according to claim 13 wherein the infrared radiation absorbing nanoparticles preferentially absorb at least 10000 times more infrared radiation than visible radiation.

18. A method according to claim 13 wherein the infrared absorbing nanoparticles comprise lanthanum hexaboride, antimony tin oxide or indium tin oxide.

19. A method according to claim 13 wherein the solar control film has a visible light transmission of greater than 70%.

20. A method according to claim 13 wherein the oriented solar control film comprises a plurality of alternating polymeric layers of a first polymer material and a second polymer material and at least one of the alternating layers is birefringent and oriented and the alternating polymeric layers cooperate to reflect infrared radiation.

* * * * *

UNITED STATES PATENT AND TRADEMARK OFFICE
CERTIFICATE OF CORRECTION

PATENT NO. : 7,952,805 B2
APPLICATION NO. : 11/466232
DATED : May 31, 2011
INVENTOR(S) : Daniel Joseph McGurran It is certified that error appears in the above-identified patent and that said Letters Patent is hereby corrected as shown below:

Column 4
Line 41, Delete "$\Delta n_z \leq 0$." and insert in place thereof -- $\Delta n_z < 0$. --.

Column 7
Line 61, Delete "pyrrols" and insert in place thereof -- pyrroles --.

Column 9
Line 22, Delete "spectrophotmetric" and insert in place thereof -- spectrophotometric --.

Column 10
Lines 21-22, Delete "masterbatchs" and insert in place thereof -- masterbatches --.

Line 38 (Approx.), Delete "Masterbatchs" and insert in place thereof -- Masterbatches --.

Column 12
Line 44 (Approx.), In Claim 16, delete "3." and insert in place thereof -- 3% --.

Signed and Sealed this
First Day of May, 2012

David J. Kappos
*Director of the United States Patent and Trademark Office*